United States Patent [19]

Raisleger

[11] Patent Number: 4,645,916

[45] Date of Patent: Feb. 24, 1987

[54] ENCODING METHOD AND RELATED SYSTEM AND PRODUCT

[75] Inventor: Ronald J. Raisleger, Torrance, Calif.

[73] Assignee: Eltrax Systems, Inc., Stillwater, Minn.

[21] Appl. No.: 531,164

[22] Filed: Sep. 9, 1983

[51] Int. Cl.[4] ............................................. G06K 19/06
[52] U.S. Cl. .................................. 235/494; 235/436; 235/449; 340/347 DD
[58] Field of Search ...................... 235/436, 449, 494; 340/347 DD; 360/40, 44

[56] References Cited

U.S. PATENT DOCUMENTS

| | | |
|---|---|---|
| 3,624,615 | 11/1971 | Lippold et al. |
| 3,653,000 | 3/1972 | Kielar et al. |
| 3,727,190 | 4/1973 | Vogelman et al. |
| 3,753,245 | 8/1973 | Philipps et al. |
| 3,778,774 | 12/1973 | Philipps et al. |
| 3,790,754 | 2/1974 | Black et al. |
| 3,829,844 | 8/1974 | Zonneveld et al. |
| 3,831,006 | 8/1974 | Chaffin, III et al. |
| 3,839,708 | 10/1974 | Bredesen et al. |
| 3,848,112 | 11/1974 | Weichselbaum et al. |
| 3,869,700 | 3/1975 | Cook et al. |
| 3,918,047 | 11/1975 | Denes .......................... 340/347 DD |
| 3,970,996 | 7/1976 | Yasaka et al. |
| 3,996,450 | 12/1976 | Kerkhoff . |
| 4,013,894 | 3/1977 | Foote et al. |
| 4,055,746 | 10/1977 | Peterson . |
| 4,085,446 | 4/1978 | Nagamura . |
| 4,108,362 | 8/1978 | Trussell et al. |
| 4,130,881 | 12/1978 | Haessler et al. |
| 4,164,320 | 8/1979 | Irazoqui et al. |
| 4,177,456 | 12/1979 | Fukinuki et al. ............ 340/347 DD |
| 4,181,251 | 1/1980 | Becker . |
| 4,219,151 | 8/1980 | Haruki . |
| 4,242,730 | 12/1980 | Golias et al. |
| 4,268,744 | 5/1981 | McGeary . |
| 4,304,990 | 12/1981 | Atalla . |
| 4,340,810 | 7/1982 | Glass . |
| 4,357,529 | 11/1982 | Atalla . |
| 4,358,672 | 11/1982 | Hyatt et al. |
| 4,359,630 | 11/1982 | Simonotti et al. |

Primary Examiner—David L. Trafton
Attorney, Agent, or Firm—Henry M. Bissell

[57] ABSTRACT

Methods for variably encoding recorded information in accordance with the type of information which is recorded. The information is organized into types of numeric data, alpha data, alphanumeric data and ASCII character data. Numeric data is encoded in 4-bit code; alpha data is encoded in 5-bit code; alphanumeric data is encoded in 6-bit code; and ASCII character data is encoded in 7-bit code. The fields of the individual data code groups are variable in length to fit the length of the individual data code group stored therein. Each individual field is terminated by a field separator encoded in the same type code as the data type contained in that field. A type separator at the end of each data type signifies transition to data of the next type. This encoding method is particularly adapted to the recording of information in a limited recording area, such as a credit card. A card of that type having one or more magnetic stripes recorded in accordance with the encoding method is described, together with methods of reading and displaying the encoded information in predetermined patterns.

45 Claims, 5 Drawing Figures

4,645,916

ENCODING METHOD AND RELATED SYSTEM AND PRODUCT

BACKGROUND OF THE INVENTION

1. Field of the Invention

This invention relates to data processing systems and, more particularly, to such systems, designed for the processing of medical information, which incorporate a particular encoding scheme for data to be magnetically stored on a pocket card.

2. Description of the Prior Art

A multitude of data processing systems has been developed which involve the use of computer related equipment for patient admission in a health care setting. A predecessor system of applicant herein utilizes a machine readable card, similar to a credit card, on which there is located a magnetic stripe which is encoded with data pertaining to the person to whom the card is issued. Such data may include, for example, the name, address, telephone and social security numbers of the individual, his employer, and other information of interest such as his health insurance coverage, principal dependent or personal contact, and the like.

Upon presentation of the card to the admitting facility of a hospital, the magnetic stripe on the card is read by a magnetic card reader and the data is displayed on a pair of video monitor screens at the patient admitting station. One of the monitors is positioned to be viewed by the admitting station operator, the other is positioned to be viewed by the patient. The operator then edits (adds/deletes/changes) the displayed data in response to information given by the patient by means of an associated keyboard which causes such additional information to be displayed on both screens. Thus the patient is able to see the information which is being entered in order to check it for accuracy. At the completion of the edit process, the magnetic stripe is re-written with the updated information from the screen. Additionally, said information may be sent to any output devices attached to the system, such as printers, disks, computers, embossers, and the like.

Of general interest to the field of the present invention are magnetically encoded credit cards and systems for reading such cards automatically, including, for example, so-called automated teller systems used by banks for dispensing cash in response to the insertion of a valid pocket card having magnetically encoded information thereon.

U.S. Pat. No. 3,653,000 to Kielar et al shows a system which is used to register in and out doctors in a hospital setting. The doctors each have a card having characters which are punched onto the card. The system may be programmed to store messages which are displayed on a screen when the doctor inserts his card in the system card reader.

U.S. Pat. No. 3,727,190 to Vogelman et al discloses a system for compiling, storing and displaying patient clinical information.

U.S. Pat. No. 3,790,754 to Black et al shows a card including a magnetic data track having regions of differing magnetic properties. p U.S. Pat. No. 3,848,112 to Weichselbaum et al discloses a system wherein a patient entering a hospital is issued an identification bracelet having a magnetic tag which is correlated to magnetically coded tags dispensed for attachment to samples and prescriptions.

U.S. Pat. No. 3,869,700 to Cook et al discloses a card 10 with a magnetizable layer of magnetic oxide formed thereon. The encoded data is organized by zones, one of which is not subject to re-encoding, another of which can be written over with different data.

U.S. Pat. No. 3,970,996 to Yasaka et al discloses a computer system for collecting patient medical data. The system includes a card reader which accepts ID cards having individual identification numbers thereon.

U.S. Pat. No. 3,996,450 to Kerkhoff discloses a system of the automated teller type which uses a credit card to dispense money from a machine. This card includes a stripe of magnetic material with three tracks for containing both programmable data regions and secure data regions.

U.S. Pat. No. 4,108,362 to Trussell et al discloses a vehicle diagnosis system using a card having a data stripe which is readable by a card reader.

U.S. Pat. No. 4,164,320 to Irazouqui et al discloses a patient identification system including a wrist band with a plastic button having a magnetically encodable portion to enable patient information to be encoded thereon. This system is associated with a central computer for keeping records of accounting, billing and the like.

U.S. Pat. No. 4,268,744 to McGeary shows a credit-card type card with magnetic tracks which are used for storing and recording golfing data. The tracks are preprogrammed with security data.

U.S. Pat. Nos. 4,304,990 and 4,357,529 to Atalla show a credit-card type operating system with provision for preventing counterfeiting of cards. Controls are provided which involve the individual as well as the issuing institution.

U.S. Pat. No. 4,359,630 to Simonotti discloses a credit card operable banding system wherein the card includes both a "read-only track" for identification data and a "reading and writing" track for transient data.

U.S. Pat. No. 4,085,446 to Nagamura discloses a data storage/retrieval system using a magnetic card for inputting data with provision for storage on floppy disks and other mass memory media.

Magnetically encoded cards of the credit-card type are severely limited in the amount of data which can be encoded thereon. Even where the card is provided with more than one magnetic stripe, previously known encoding schemes still do not permit sufficient information to be encoded which would encompass the personal data recorded on cards for use in the above-described predecessor system and, in addition, the pertinent information relating to an individual's health record and other facility utilization data that would be useful to have encoded on a card for use in such a system.

SUMMARY OF THE INVENTION

In brief, arrangements in accordance with the present invention utilize a unique encoding method to increase the amount of information which may be recorded on a magnetic stripe of a pocket card by utilizing a principle of organizing the data into specifically defined categories and having the categories grouped into sections. This encoding method advantageously permits the realization of substantial economy and efficiency in the storage of encoded data, since it eliminates storage space which is allocated in prior art systems which utilize the same number of bits (binary digits) to represent data of different types or which require space for each data field sufficient to accommodate the maximum number of characters in a field. The recording method of this invention is designed to be inherently variable, versus the fixed length encoding of prior art systems referred to above.

The format of recorded information and the related terminology of the encoding scheme in accordance with the present invention may be particularly defined as follows:

A *stripe* is comprised of *sections*. A section is a logical group of data types. There is a minimum of one and a maximum of seven sections on a stripe. As an example, a card containing Admit Data is divided into two sections: Common and Proprietary sections. "Common" refers to data which is to be readable by any facility having a system of the type described herein. "Proprietary" refers to data that is written onto the card by a particular facility and is only readable by the facility that last wrote on the card. Sections may be defined in accordance with the requirements imposed on the system in a given facility, the utilization to which the recorded data is to be put, the information content and type of data recorded, and the like.

A *section* is comprised of *types*. A data type is a group of data fields. Each section will have four distinct types:
(1) numeric data type
(2) alpha data type
(3) alphanumeric data type
(4) ASCII data type A *type* is comprised of *fields*. A data field is a grouping of codes representing characters or digits. Each data type contains a plurality of data fields. The number of data fields is variable within each data type.

A *field* is comprised of *codes*. A data code is a grouping of bits (binary digits) used by the system to represent a character or digit. The length of the code is dependent upon the particular data type to which the field belongs. Further economies in the storage of data are realized from the fact that the system does not record leading zeros for numeric data type or trailing spaces for alpha, alphanumeric and ASCII data types. Data of the numeric type are represented by 4-bit codes; data of the alpha type are represented by 5-bit codes; data of the alphanumeric type are represented by 6-bit codes; and data of the ASCII type are represented by 7-bit codes. ASCII is the widely used character code set of the American Standard Code for Information Interchange.

A *code* is comprised of *bits*. A bit is the smallest unit of information which can be recorded on the magnetic stripe. Combinations of bits will represent a code which is recognizable by the system.

In accordance with an aspect of the invention, each section on the magnetic stripe is organized with its respective data types in a predetermined order: numeric, alpha, alphanumeric and ASCII. The first field of the numeric type of the first card section is designated a card prefix. The placement of the card prefix insures that it will be read before any other data recorded on the card. The card prefix is provided for the recording of special data which indicates the type of information on the card, how many sections of data are contained on the card, and other related card identifying data to assist the system in determining how the data will be processed.

For each code group, two distinct codes are reserved for field separation and type separation, respectively. Since the data in the card prefix is of the numeric type, a numeric field separator is recorded at the end of the card prefix field. The remainder of the numeric data type contains numeric fields, such as telephone numbers, zip codes and the like. These data fields are of different lengths, depending upon the particular numeric data contained therein, and each field is terminated by a field separator in numeric data code (hexadecimal E: 1110). At the end of the numeric data type, a type separator (hexdecimal F: 1111) is recorded to signal the transition from the numeric type to the alpha type.

The alpha type contains alpha fields, such as patient names, employer names, cities, states, etc., recorded in 5-bit alpha code. These fields vary in length, depending upon the data content, and are separated by field separators represented by an alpha code (hexadecimal 1E: 11110). At the end of the alpha data type there is recorded a type separator in alpha code, corresponding to an alpha code (hexadecimal 1F: 11111). This signals the end of the alpha type and the transition to the alphanumeric type.

The alphanumeric type contains alphanumeric fields, such as street addresses, for example, recorded in 6-bit code. The fields are variable in length in accordance with the content of the data and are separated by field separators of alphanumeric code (hexadecimal 3E: 111110). The termination of the alphanumeric data type and the transition to the ASCII type is signalled by a recorded type separator of alphanumeric code (hexadecimal 3F: 111111).

The ASCII data type contains data which is encoded in standard ASCII code characters, such as data received from the keyboard, in 7-bit code corresponding to the decimal numbers 000 through 125. Decimal 126 (1111110) is reserved for the field separator code; decimal 127 (1111111) is reserved for the type separator code which is recorded at the end of the ASCII data type. This type separator also signals the termination of the first section, following which, if the next section is also to be read, the cycle repeats—numeric, alpha, alphanumeric and ASCII data types.

Pocket cards recorded with data encoded in accordance with the encoding method of the present invention facilitate the admitting procedure in a health care facility equipped with systems in accordance with the present invention, for example. One such system comprises a data entry terminal having a console encasing the magnetic stripe card reader/writer, a keyboard, and the computer circuit boards for the operation of the system. Two video display monitors are also included, one for the terminal operator and the other for the patient being admitted. The admit information is displayed simultaneously on both screens so that it can be double checked for accuracy. The computer hardware within the console comprises a microprocessor, memory and communications logic which makes it possible to customize the terminal to each individual user's error checking, data communications and printing requirements. This data entry terminal is an "intelligent terminal" capable of operation in a "stand-alone" mode or in an "on-line" mode to a host computer. Where the system is coupled to a host computer, a feature of the system enables the terminal to continue in operation for the admitting function, even if the host computer is "down". Use of a pocket card of the type described in systems in accordance with the invention typically enables the admitting facility to save up to 90% of the time it normally takes to type an admission record if the card has been recorded with the information from a prior admission. Even if the patient is a first time admittee, the time savings will amount to approximately 30% of the time usually required to type an admission form.

When the data is read from the card is a system embodying the invention, it is displayed on the monitor screens in a format customized for the particular facility involved. The system also writes data onto the card in the appropriate fields and sections, as for example to update the information if a person has moved or changed jobs or if current data representing blood tests, X-rays and the like are to be recorded.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
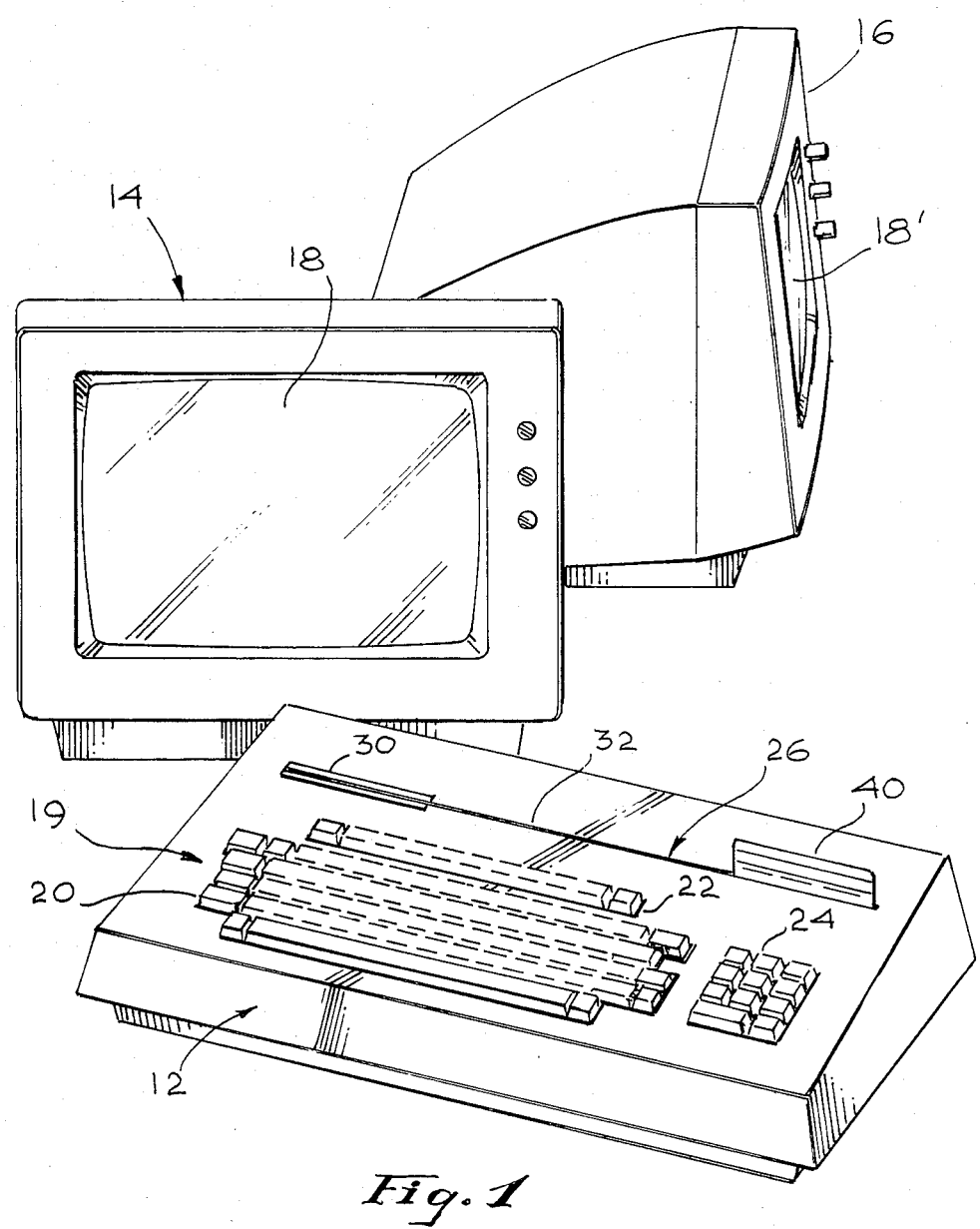
FIG. 1 is a diagram illustrating the components of a data processing system operated in conjunction with pocket cards encoded in accordance with the present invention.

FIG. 1 illustrates the components for a terminal station of a system in accordance with the present invention as might be configured for the patient admitting station of a health care facility, for example, to which utilization the preferred embodiment is particularly directed. The principal units making up the terminal station as shown in FIG. 1 comprise a console 12, a master video monitor 14 and a slave monitor 16. Both the monitors 14, 16 are of the standard type having a video display area 18, 18' on which typical alphanumeric characters may be displayed. Under control of equipment in the console 12, both of the monitors 14, 16 display identical information. It is intended that the slave monitor 16 is placed where the person providing information to the operator for entry into the system may view the data as entered and thus be able to check the accuracy of the entered information as it is displayed on screen 18'. The master monitor 14 is situated so that its screen 18 is visible to the operator.

The console 12 has a keyboard 19 comprising a main key pad 20, a programmable function key pad 22 and a cursor control key pad 24. The main key pad includes a standard "qwerty" type keyboard (secretarial style) together with various management keys for manipulating the screen display and controlling system operation. Situated along the upper face of the console 12, above the key pads, is a magnetic card read/write transport unit 26. This is shown having an insertion/removal section 30 and a traverse slot 32. A card 40 is shown positioned within the slot 32 in a location where the card would be if it had just been read by the read/write unit 26. To be read, the card 40 is inserted in the portion 30 and manually transported along the slot 32. An associated read head (not shown) "reads" the data which is recorded magnetically on the card 40 as it traverses the slot 32 from left to right. After reading, the card 40 may be lifted out of the slot 32 from the position in which it is shown in FIG. 1 or, alternatively, it may be directed to traverse the slot 32 from right to left, returning to the portion 30, if a "write" operation is desired. The unit 26 includes read and write heads, position detectors such as photocells, and a circuit board for performing the various functions of reading and writing a card such as 40. The card transport unit 26 with its associated components as mentioned is a standard item which is obtainable from Mag-Tek, Inc. of Carson, Calif.

Figure 2:
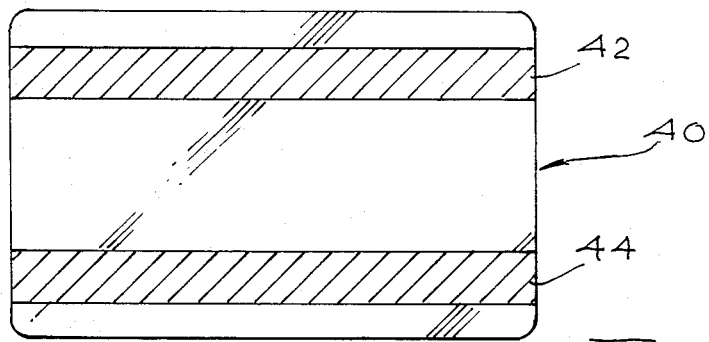
FIG. 2 is a representation of a pocket card of the type used in the practice of the invention.

The card 40 is shown in FIG. 2. This is a conventional credit card-type of card, typically a small plastic sheet having appropriate visible indicia on the front face with a first magnetic stripe 42 situated on the back of the card 40, as shown in FIG. 2. A second stripe 44 is provided optionally for additional storage capability. The magnetic stripe 44 is read from or written to by placing the card 40 in the portion 30 of the card transport unit 26 in the orientation shown in FIG. 2 and moving the card as described. To read or write the optional magnetic stripe 42, the card 40 is inverted and placed in the card transport 26 as described.

In addition to the elements of the card transport unit 26 as described, the console 12 contains the electronics for controlling the system. These include a microprocessor (CPU), computer memory, a CRT controller, and communication logic and ports. The memory comprises four kilobytes (4K) of random access memory (RAM) and 16K PROM (programmable read only memory).

It will be appreciated that the magnetic stripe of a credit-card type storage medium as used in the system of this invention and in other prior art systems discussed above is extremely limited in information storage capacity. The storage capacity may vary somewhat depending upon the type of data which is to be recorded, since it is customary to set the length of the fields for record storage equal to the length of field required for the longest record, but the maximum number of characters which may be stored on a magnetic stripe on cards in common use is approximately 350 characters, using either the ISO or the ABA standard. By using the encoding method of the present invention, in conjunction with a recording density of approximately 3840 bits per stripe, applicant is able to realize a storage capacity on the order of 800 characters on a single magnetic stripe on a standard card which is approximately 3⅜ inches in length. It will be appreciated that the increased storage is extremely important for systems such as the system of the preferred embodiment which is designed specifically for use in health care facilities. This encoding method incorporates an organization of data as recorded which takes advantage of the type of data which is involved to develop variable length character codes for different data types on the storage medium. Also the record fields are variable in length, being adjusted in accordance with the specific data being recorded and thus eliminating the need for additional space normally required in some record systems to accommodate field length to the length of the longest record.

Figure 3:
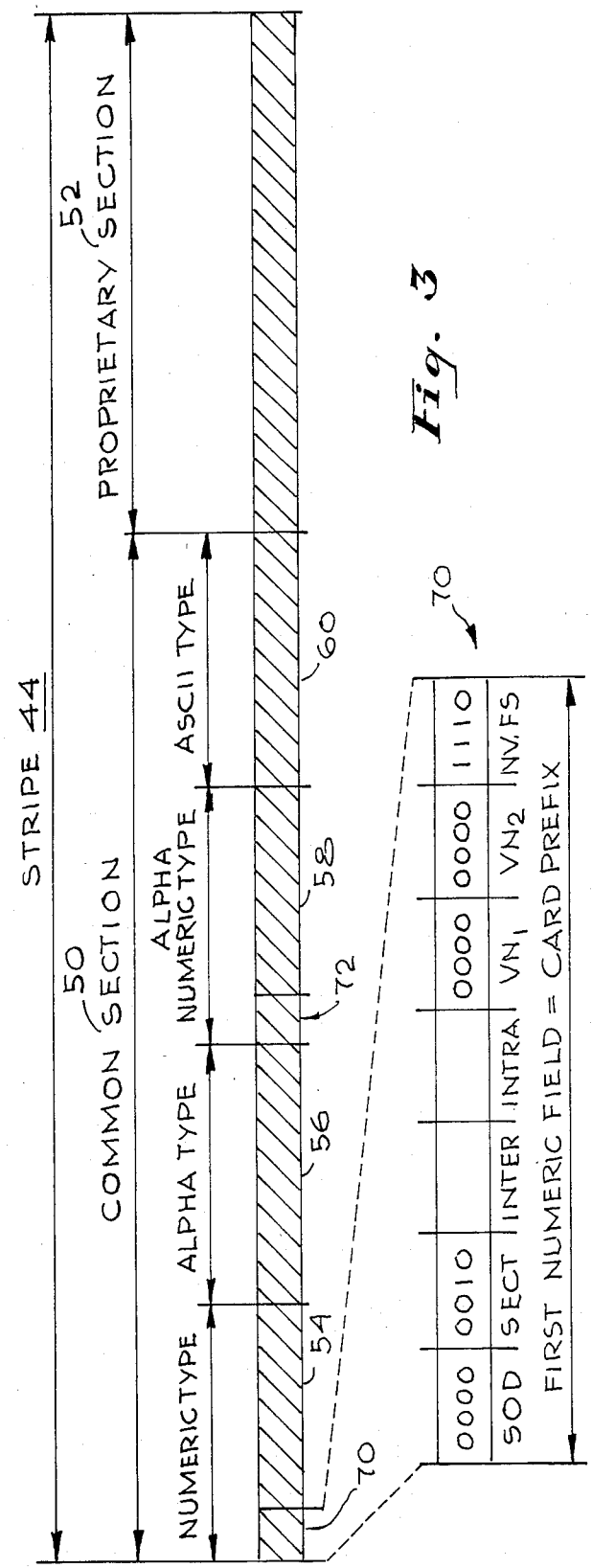
FIG. 3 is a diagram representing the encoding format of the present invention.

FIG. 3 illustrates the format of the encoding method utilized to achieve this desired result of substantially increased storage capacity for a credit card type magnetic stripe. The data bits are organized and recorded in the method and format illustrated in FIG. 3, which shows the organization of an exemplary magnetic stripe such as 44 of FIG. 2. This stripe 44 is shown as it would be recorded for information utilized as an Admit Record. Such a record is divided into two sections. Each of these sections is organized for the four types of data which are encountered in the operation of the system. Thus the common section 50 is shown divided into four data types, a numeric type 54, an alpha type 56, an alphanumeric type 58 and an ASCII type 60. The numeric type 54 will only have numeric data recorded therein. Numeric data is represented by 4-bit codes, as shown in the code set of the following Table I.

TABLE I

| NUMERIC CODES: |
| --- |
| (4-bit codes) |
| 0000 = 00 = 0 |
| 0001 = 01 = 1 |
| 0010 = 02 = 2 |
| 0011 = 03 = 3 |
| 0100 = 04 = 4 |
| 0101 = 05 = 5 |
| 0110 = 06 = 6 |
| 0111 = 07 = 7 |
| 1000 = 08 = 8 |
| 1001 = 09 = 9 |
| 1010 = 0A = (space) |
| 1011 = 0B = # (pound) |
| 1100 = 0C = - (hyphen) |
| 1101 = 0D = . (period) |
| 1110 = 0E = FS |
| 1111 = 0F = TS |

Numeric data, as defined in the present encoding scheme, includes the decimal digits 0 through 9, the space, the pound sign, the hyphen and the period.

The alpha section 56 is reserved for data of the alpha type. This data is represented by 5-bit codes, as indicated in the code set of Table II.

TABLE II

| ALPHA CODES: |
| --- |
| (5-bit codes) |
| 00000 = 00 = A |
| 00001 = 01 = B |
| 00010 = 02 = C |
| 00011 = 03 = D |
| 00100 = 04 = E |
| 00101 = 05 = F |
| 00110 = 06 = G |
| 00111 = 07 = H |
| 01000 = 08 = I |
| 01001 = 09 = J |
| 01010 = 0A = K |
| 01011 = 0B = L |
| 01100 = 0C = M |
| 01101 = 0D = N |
| 01110 = 0E = O |
| 01111 = 0F = P |
| 10000 = 10 = Q |
| 10001 = 11 = R |
| 10010 = 12 = S |
| 10011 = 13 = T |
| 10100 = 14 = U |
| 10101 = 15 = V |
| 10110 = 16 = W |
| 10111 = 17 = X |
| 11000 = 18 = Y |
| 11001 = 19 = Z |
| 11010 = 1A = (space) |
| 11011 = 1B = ' (apost.) |
| 11100 = 1C = , (comma) |
| 11101 = 1D = - (hyphen) |
| 11110 = 1E = FS |
| 11111 = 1F = TS | p The alpha type data includes the letters of the alphabet A–Z, the space, the apostrophe, the comma and the hyphen.

The alphanumeric type 58 is reserved for alphanumeric data. This data is represented by 6-bit codes, as shown in the code set of Table III.

TABLE III

| ALPHANUMERIC CODES: |
| --- |
| (6-bit codes) |
| 000000 = 00 = (space) |
| 000001 = 01 = ! (exclamation) |
| 000010 = 02 = " (quotation) |
| 000011 = 03 = @ (pound) |
| 000100 = 04 = $ (dollar) |
| 000101 = 05 = % (percent) |
| 000110 = 06 = & (ampersand) |
| 000111 = 07 = ' (apostrophe) |
| 001000 = 08 = ( (left paren) |
| 001001 = 09 = ) (right paren) |
| 001010 = 0A = * (asterisk) |
| 001011 = 0B = + (plus) |
| 001100 = 0C = , (comma) |
| 001101 = 0D = - (hyphen) |
| 001110 = 0E = . (period) |
| 001111 = 0F = / (slant) |
| 010000 = 10 = 0 |
| 010001 = 11 = 1 |
| 010010 = 12 = 2 |
| 010011 = 13 = 3 |
| 010100 = 14 = 4 |
| 010101 = 15 = 5 |
| 010110 = 16 = 6 |
| 010111 = 17 = 7 |
| 011000 = 18 = 8 |
| 011001 = 19 = 9 |
| 011010 = 1A = : (colon) |
| 011011 = 1B = ; (semicolon) |
| 011100 = 1C = < (less than) |
| 011101 = 1D = = (equals) |
| 011110 = 1E = > (greater than) |
| 011111 = 1F = ? (question) |
| 100000 = 20 = @ (commer. at) |
| 100001 = 21 = A |
| 100010 = 22 = B |
| 100011 = 23 = C |
| 100100 = 24 = D |
| 100101 = 25 = E |
| 100110 = 26 = F |
| 100111 = 27 = G |
| 101000 = 28 = H |
| 101001 = 29 = I |
| 101010 = 2A = J |
| 101011 = 2B = K |
| 101100 = 2C = L |
| 101101 = 2D = M |
| 101110 = 2E = N |
| 101111 = 2F = O |
| 110000 = 30 = P |
| 110001 = 31 = Q |
| 110010 = 32 = R |
| 110011 = 33 = S |
| 110100 = 34 = T |
| 110101 = 35 = U |
| 110110 = 36 = V |
| 110111 = 37 = W |
| 111000 = 38 = X |
| 111001 = 39 = Y |
| 111010 = 3A = Z |
| 111011 = 3B = [ (lt. bracket) |
| 111100 = 3C = \ (rev. slant) |
| 111101 = 3D = ] (rt. bracket) |
| 111110 = 3E = FS |
| 111111 = 3F = TS |

As shown in Table III, this alphanumeric data includes the numbers 0–9, the alphabet letters A–Z, plus a variety of punctuation marks for a total of 62 characters.

The ASCII section 60 is encoded with 7-bit codes in conventional fashion. The following Table IV shows a standard ASCII character code set with the decimal and hexadecimal values for each of 128 ASCII characters being set forth therein.

TABLE IV

| Dec | Hex | CHR | Dec | Hex | CHR | Dec | Hex | CHR |
|-----|-----|-----|-----|-----|-----|-----|-----|-----|
| 000 | 00H | NUL | 043 | 2BH | + | 086 | 56H | V |
| 001 | 01H | SOH | 044 | 2CH | , | 087 | 57H | W |
| 002 | 02H | STX | 045 | 2DH | - | 088 | 58H | X |
| 003 | 03H | ETX | 046 | 2EH | . | 089 | 59H | Y |
| 004 | 04H | EOT | 047 | 2FH | / | 090 | 5AH | Z |
| 005 | 05H | ENQ | 048 | 30H | 0 | 091 | 5BH | [ |
| 006 | 06H | ACK | 049 | 31H | 1 | 092 | 5CH | \ |
| 007 | 07H | BEL | 050 | 32H | 2 | 093 | 5DH | ] |
| 008 | 08H | BS | 051 | 33H | 3 | 094 | 5EH |  |
| 009 | 09H | HT | 052 | 34H | 4 | 095 | 5FH | . |
| 010 | 0AH | LF | 053 | 35H | 5 | 096 | 60H |  |
| 011 | 0BH | VT | 054 | 36H | 6 | 097 | 61H | a |
| 012 | 0CH | FF | 055 | 37H | 7 | 098 | 62H | b |
| 013 | 0DH | CR | 056 | 38H | 8 | 099 | 63H | c |
| 014 | 0EH | SO | 057 | 39H | 9 | 100 | 64H | d |
| 015 | 0FH | SI | 058 | 3AH | : | 101 | 65H | e |
| 016 | 10H | DLE | 059 | 3BH | ; | 102 | 66H | f |
| 017 | 11H | DC1 | 060 | 3CH | < | 103 | 67H | g |
| 018 | 12H | DC2 | 061 | 3DH | = | 104 | 68H | h |
| 019 | 13H | DC3 | 062 | 3EH | > | 105 | 69H | i |
| 020 | 14H | DC4 | 063 | 3FH | ? | 106 | 6AH | j |
| 021 | 15H | NAK | 064 | 40H | @ | 107 | 6BH | k |
| 022 | 16H | SYN | 065 | 41H | A | 108 | 6CH | l |
| 023 | 17H | ETB | 066 | 42H | B | 109 | 6DH | m |
| 024 | 18H | CAN | 067 | 43H | C | 110 | 6EH | n |
| 025 | 19H | EM | 068 | 44H | D | 111 | 6FH | o |
| 026 | 1AH | SUB | 069 | 45H | E | 112 | 70H | p |
| 027 | 1BH | ESCAPE | 070 | 46H | F | 113 | 71H | q |
| 028 | 1CH | FS | 071 | 47H | G | 114 | 72H | r |
| 029 | 1DH | GS | 072 | 48H | H | 115 | 73H | s |
| 030 | 1EH | RS | 073 | 49H | I | 116 | 74H | t |
| 031 | 1FH | US | 074 | 4AH | J | 117 | 75H | u |
| 032 | 20H | SPACE | 075 | 4BH | K | 118 | 76H | v |
| 033 | 21H | ! | 076 | 4CH | L | 119 | 77H | w |
| 034 | 22H | " | 077 | 4DH | M | 120 | 78H | x |
| 035 | 23H | # | 078 | 4EH | N | 121 | 79H | y |
| 036 | 24H | $ | 079 | 4FH | O | 122 | 7AH | z |
| 037 | 25H | % | 080 | 50H | P | 123 | 7BH | { |
| 038 | 26H | & | 081 | 51H | Q | 124 | 7CH | \| |
| 039 | 27H | ' | 082 | 52H | R | 125 | 7DH | } |
| 040 | 28H | ( | 083 | 53H | S | 126 | 7EH | - |
| 041 | 29H | ) | 084 | 54H | T | 127 | 7FH | DEL |
| 042 | 2AH | * | 085 | 55H | U |  |  |  |

The corresponding machine language codes extend from 0000000 to 1111111, as is well known.

There are two exceptions to the standard ASCII character code set for the present encoding scheme. From a review of Tables I, II and III, it will be noted that the last two characters of each code set are designated FS and TS, standing for field separator and type separator, respectively. The exception to the standard ASCII code character set of Table IV, as noted, is that decimal 126 equals FS and decimal 127 equals TS.

Regardless of the type of data which is encoded, whether numeric, alpha, alphanumeric or ASCII, a field separator (in the code for the particular type of data being encoded) is encoded at the end of each individual data field to indicate the termination of the field. Thus the next code following a field separator is the beginning of the next data field of the same type. When all of the data fields of a given type are recorded, a type separator is inserted, immediately following the last data field, to indicate the end of the present data type, to be followed in the very next bit space by data of the next data type in order.

For example, after all the numeric data—the telephone numbers, social security number, insurance policy number, zip codes and the like—have been recorded, a type separator (1111) is inserted to signify that the next data will be of the alpha type and the transition from the numeric type 54 to the alpha type 56 will occur. Similarly for a 5-bit type separator (11111) at the end of the alpha type 56, a 6-bit type separator (111111) at the end of the alphanumeric type 58 and a 7-bit type separator (1111111) at the end of the ASCII type 60. Following the termination of the ASCII type 60 in the common section 50, the complete cycle is repeated for the proprietary section 52. It will be appreciated that, by use of type separators in this manner to demark the transitions from one type to the next, the respective data types will not be arbitrarily fixed in length but instead will be variable to correspond to the number of data elements which are to be stored in the respective data types. It will also be understood that the above description relative to FIG. 3 has been set forth in terms of recording the data, merely for ease of explanation. In reality, the data is organized in the manner described and is transmitted from the CPU to a read/write buffer where it is temporarily stored until the card 40 is moved to traverse the slot 30 in the manner previously described for the write function, so that the previously organized data stream is written to realize the encoded recording exemplified in FIG. 3. In accordance with this encoding method, not only do the type separators signal the end of one type of data and the recording of the next in the very next bit space, but the field separators serve a similar purpose in signifying the end of one complete data field so that the very next bit space can be used for the beginning of the next data field of the same type.

The common section 50 of a card record contains information which is used by all facilities utilizing the system. That is, when a card is first prepared for a particular individual from information that individual may have submitted in writing on an application form for health insurance coverage or on admitting a patient who has not previously had a card, such information is organized into common and proprietary data. The common data is that to which resort is had by all facilities using the system. There may also be particular information which is of interest only to a given hospital and not to others, in which case this is classified as proprietary information for recording in the proprietary section 52. Proprietary information is only recorded on the card by the particular facility which is concerned with such data. Thus, the present encoding method provides that the proprietary section 52 of a card can only be read by the facility in which the card was last recorded. The identification of that facility is contained in the first field 72 in the alphanumeric type 58 of the common section 50. Thus, unless there is a match between a code for the facility reading the card and the first alphanumeric data field of the common section, the proprietary section cannot be read.

In accordance with the encoding method of the present invention, each recording on a given magnetic stripe 44 begins with a card prefix 70, as shown in FIG. 3. This is situated in the numeric type 54 because the contents of the card prefix, while not constituting numeric data in the sense of the characters shown in Table I, are organized in 4-bit groups, like the codes of Table I. This card prefix 70 is recorded as the first field of the first numeric type 54 of the first section of a card. The card prefix serves to define the remainder of the stripe 44. The card prefix contains a number of flags and identifiers, all in the equivalent of 4-bit machine code, which will enable the system computer to initiate processing of data read from the card, to interpret certain identifying information, and the like. The various segments of the card prefix 70 are organized as follows:

1. SOD. This is a group which is reserved for future use.

2. SECT. This code specifies the number of card sections, which may be from 1 to 7 sections.

3. INTER. This is the inter-installation code which contains flags which have a common meaning to all facilties utilizing this system. There are two pieces of information which this codes indicates, as follows. The code is of the form XXXY, XXX designating card type while Y designates card status. In the card status position, "0" signifies a written card while "1" indicates a blank card. In the card type position, 000 designates an admit card while 001 designates a health card. The codes 010 to 110 are not defined; 111 is reserved.

4. INTRA. This is an intra-installation code which contains individual bits signifying flags relating to events within the admitting hospital. For example, one such flag might identify the card being read as a back-up card, perhaps prepared during a time when the hospital's host computer was inoperative. The action to be taken with the back-up card would be to send the recorded information to the host computer, once it is operating, and then clear the card.

5. VN1, VN2. These two segments together constitute an assigned vendor number, to indicate the particular vendor to whom the card belongs.

The final code, designated NU.FS, is the code 1110 for the numeric field separator and signifies the end of the card prefix field 70.

Figure 4:
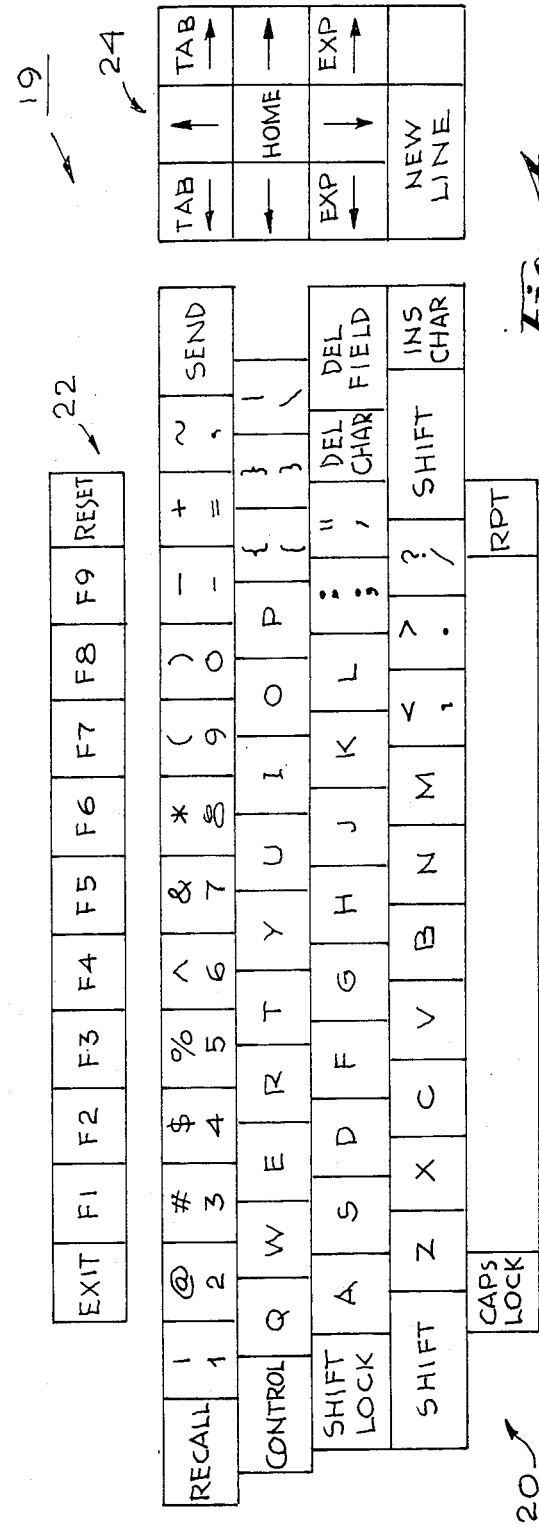
FIG. 4 is a diagram illustrating a preferred layout of an operator keyboard for use in systems of the present invention.

FIG. 4 shows the keyboard 19 of the console 12, comprising the main key pad 20, the programmable function key pad 22 and the cursor control key pad 24. The keyboard has been modified to provide specific codes to aid the operator in the admit procedure. Most of the individual keys are self-explanatory (e.g. the cursor control keys and the main key pad). The following keys provide specific functions in the operation of the system, as described.

1. RECALL. This key will recall to the operator's screen all the data from a previous admission. This data may be re-sent to any device which is attached to the system, or can be used simply for the operator to review.

2. SEND. This key initiates the output transfer of data currently displayed on the operator's screen. The system provides an OUTPUT SELECT line at the top of the screen which the operator uses to indicate the particular associated devices (peripherals) to which data is to be sent. The permissible peripherals depend upon a particular installation, but some of the most common peripheral devices are the card reader/writer, a form printer, a floppy disk drive, a label printer, and an automatic embosser.

3. F1-F9. These keys are function keys which allow the operator to perform redundant or complex operations with a single key stroke. They act as a template, depending upon the active mode of the system. For example, when the system is in the IDLE MODE, "F1" may be used to enter a mode for setting data and time into the system. If the active mode is the ADMIT MODE, "F1" may mean to automatically assign the next patient number.

4. EXIT. This key is used by the operator to direct the computer operating system to exit the current mode and return to the IDLE MODE.

5. RESET. This key performs a "warm start" operation which resets all the hardware components in the terminal but does not clear RAM, thus preserving the information relating to the last admission which was processed.

When the SEND key is pressed, the computer operating system enters the OUTPUT MODE, which consists of directing the Admit Data to the various peripheral devices coupled to the system, as designated by the operator in the OUTPUT SELECT line. The output from a terminal always has as one of its possible selections the option to write the card in the card transport unit 26 with the updated information from the screen. During this write procedure, the previous information on the card is replaced with the data from the screen. If the operating system is in the Admit Mode of operation the card is written as an Admit Card; if the system is in the Health Record Mode, the data is written as a Health Record Card.

the health records are typically recorded on the second stripe 42 of the card 40 by inverting the card in the card transport unit 26. Thus, not only is the amount of information which may be stored on a single magnetic stripe substantially increased by virtue of the unique encoding method of the present invention, but the provision of the second stripe doubles the total storage capacity over that realized for a single stripe, and further provides a segregated location for data of a particular nature, such as health records for example.

Figure 5:
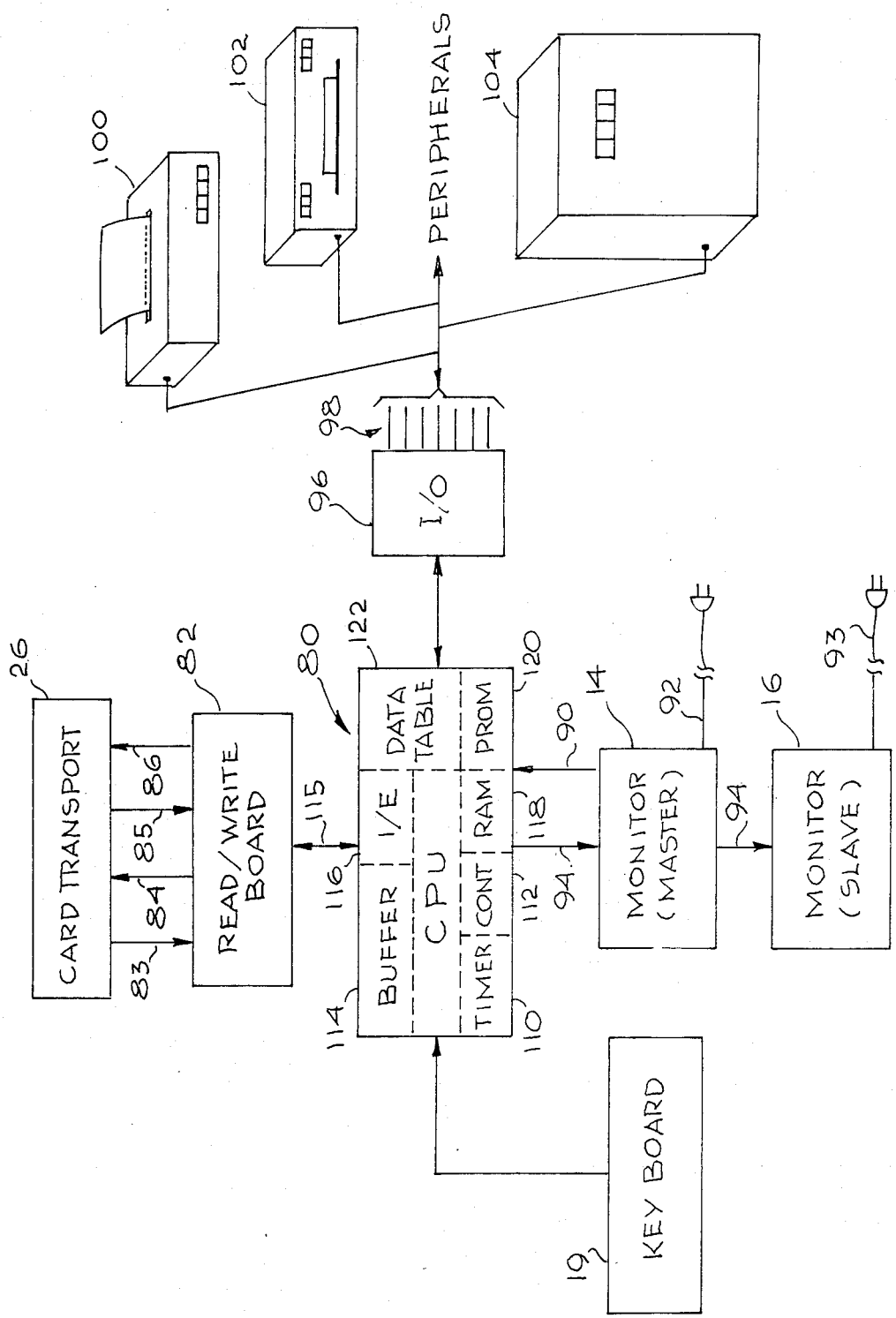
FIG. 5 is a functional block diagram of one particular embodiment of the invention.

FIG. 5 is a functional block diagram of a terminal such as is shown in FIG. 1. The heart of the system is the central processing unit board 80 to which the keyboard 19, master monitor 14, slave monitor 16 and read/write board 82 are connected. The card transport unit 26 is coupled via the read/write board 82. The read/write board 82 is provided by Mag-Tek, Inc. of Carson, Calif. Communication between the transport unit 26 and the read/write board 82 is via signal lines 83-86. Signal line 83 carries read signals from the transport unit 26 to the board 82. Line 84 transmits write signals in the opposite direction. Line 85 carries signals from photocells in the transport unit 26 which provide an indication of the specific location of the card within the transport unit. Line 86 carries signals from a rotary pulse generator on the board 82 to control the writing of the data by the transport unit 26 in serial fashion.

The CPU 80 is essentially a standard microprocessor which is available from the Comark Company of Medford, Mass. Keyboard 19 is an OAK keyboard of the full travel membrane type, also supplied by Comark. The CPU 80 receives power from the master monitor 14 via line 90, the monitors 14, 16 having power cords 92, 93 for plugging into a standard 110-volt outlet. The CPU provides video signals to the monitors 14, 16 via lines 94. The CPU 80 communicates with the various available peripheral devices by way of a matrix switcher (shown as I/O stage 96). The switcher 96 provides seven communication lines 98 for coupling to various peripherals, such as a form printer 100, a disk drive 102 and a host computer 104, as shown. Other peripherals/terminals may also be connected or substituted.

The switcher 96 is of conventional form, being commercially available for Digital Labs of Boston, Mass.

Although the CPU 80 is shown functionally as a conventional microprocessor containing a timer 110, a video controller 112, a buffer 114, a read/write interface 116, RAM 118 and PROM 120, which elements are generally common to standard microprocessors, it is the PROM 120 with its associated data table section 122 which contains the means for controlling the overall system to utilize the encoding method of the present invention. The machine instructions incorporating the program for operation in this manner are present in firmware in the computer, represented by the specific PROM 120 and its data table 122.

In the operation of the system as depicted in FIG. 5, the data from a single magnetic stripe read by the card transport unit 26 is sent from the read/write board 82 via the signal line 115 to the interface portion 116 and thence to the buffer 114. During this transmission, the data is translated into all ASCII characters for display on the monitor screens. The numerical data is presented in a prescribed order, having been organized for recording in that order. The data table 122 is organized in two portions, one each for the common and proprietary card sections. The common section of the data table is the same in each installation, whereas the proprietary section is tailored to the particular facility in which the system is installed. Upon presentation of the numerical data in RAM in the predetermined sequence, the data table specifies the particular position on the screen at which the number under consideration is to be displayed and at the same time points to a "header" corresponding to that number. For example, when the numerical data from the particular field under consideration represents a telephone number, this will be directed to the location on the screen where the telephone number is to be displayed and the header "Telephone" will be caused to be displayed in the space preceding the telephone number in the same row on the screen. These headers are part of a screen template which is installed in the firmware which is unique to the system of this invention. As a further example, the next number may be recognized as a zip code, soley by virtue of its location in RAM following the telephone number. This will be directed by the data table 122 to an allocated space on the screen (designated within the computer by row and column numbers) to follow the city, state portion of an address.

In the organization of data for writing to a card from the screen, the reverse process is followed. Data from a particular location on the screen (assigned row and column numbers), reserved for a telephone number, will be placed in the particular number field in the numeric type which is reserved for the telephone number. If a particular number is not available, the assigned space for that number on the screen will be blank and the corresponding field in the numeric type of the card will consist of just a numeric field separator. A similar procedure applies for data in the other data types of a given section on the card. The proprietary section portion of the data table 122 is organized to process the proprietary data in similar fashion. Together, the two portions of the data table 122 in conjunction with the firmware program of the PROM 120 contain the template for the specific facility in which the system is installed, developing an overall display on the monitor screens which corresponds in format to the forms utilized by that facility.

Arrangements in accordance with the present invention advantageously develop a capability for a particular facility, such as the admitting department of a hospital, to operate with increased speed and efficiency. This not only improves the economy of operation of the overall facility, particularly the department in which the system is installed, but it also improves relations with the patients by substantially reducing the time and inconvenience occasioned by the admit procedure. With the increased storage capacity of cards which are used in the operation of the system, resulting from the novel encoding methods of the present invention, and particularly by virtue of the feasibility of now recording health record information on such a card, it now becomes feasible to install a terminal in accordance with the present invention is portable facilities, such as a paramedic ambulance. In such an installation, the paramedics can instantaneously develop important information, including health record data, from the card carried by the emergency patient, even an accident victim or other patient who may be unconscious and thus unable to give the information verbally to the paramedics. The encoding method of the present invention represents a material improvement over the predecessor systems which, although equipped to operate with pocket card recorded data, are severely limited in the amount of data which can be recorded on an individual card with the encoding methods utilized heretofore.

Although there have been described above specific arrangements of an encoding method and related system and product in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. The method of encoding information for recording on a magnetic medium comprising the steps of:
    organizing data by type of information content into data types, the data types differing from each other in the minimum number of bits required to uniquely represent the data of a given type;
    encoding the data in each type in binary code by assigning codes thereto having a number of bits corresponding to said minimum number for that type, there being at least two different types of data encoded with two sets of codes differing from each other in the number of bits for each set; and
    recording the encoded data on the magnetic medium in discrete storage areas segregated by type and in a predetermined order.

2. The method of claim 1 wherein the recording step comprises recording the data by types in sequence in the order of the number of bits in a code set.

3. The method of claim 2 wherein said discrete storage areas are variable in extent, depending upon the number of fields in the type, the length of field, and the number of bits in the code set for that type.

4. The method of claim 2 wherein the extent of the discrete storage area for a type is dependent upon the lengths of the individual fields within the type, which field lengths are variable in accordance with the data contained therein.

5. The method of claim 1 wherein the recording step comprises recording data in fields of varying length, the length of an individual field corresponding to the data stored therein.

6. The method of encoding information for recording on a magnetic medium comprising the steps of:
    organizing data by type of information content into data types, the data types differing from each other in the minimum number of bits required to uniquely represent the data of a given type;

encoding the data in each type in binary code by assigning codes thereto having a number of bits corresponding to said minimum number for that type, there being at least two different types of data encoded with two sets of codes differing from each other in the number of bits for each set; and recording the encoding data on the magnetic medium;

further including the step of assigning at least one selected code in each code set to designate a fied separator and recording a field separator code for a particular type at the end of each field of that type.

7. The method of claim 6 wherein the assigning step comprises assigning discrete field separator and type separator codes for each type.

8. The method of encoding information for recording on a magnetic medium comprising the steps of:

organizing data by type of information content into data types, the data types differing from each other in the minimum number of bits required to uniquely represent the data of a given type;

encoding the data in each type in bindary code by assigning codes thereto having a number of bits corresponding to said minimum number for that type, there being at least two different types of data encoded with two sets of codes differing from each other in the number of bits for each set; and recording the encoded data on the magnetic medium;

further comprising the step of assigning one unique code in each code set to designate a type separator and recording a type separator code following the last field in a type.

9. The method of claim 8 wherein a different type separator code is recorded in each different type.

10. The method of encoding information for recording on a magnetic medium comprising the steps of:

organizing data by type of information content into data types, the data types differing from each other in the minimum number of bits required to uniquely represent the data of a given type;

encoding the data in each type in binary code by assigning codes thereto having a number of bits corresponding to said minimum number for that type, there being at least two different types of data encoded with two sets of codes differing from each other in the number of bits for each set; and recording the encoded data on the magnetic medium;

wherein the data types comprise numeric data, alpha data, alphanumeric data, and ASCII character data.

11. The method of claim 2 wherein the magnetic medium comprises at least one magnetic stripe on a pocket card.

12. The method of claim 11 wherein the sequence of data types recorded on the magnetic stripe comprises a common section having data which is to be used in common by a plurality of different facilities reading the magnetic stripe.

13. The method of claim 12 wherein the sequence of different data types in the common section is repeated in a subsequent section containing data which is different from the data in the first section.

14. The method of claim 11 wherein the first field in order in the first type recorded on the magnetic stripe comprises a prefix field containing information for identifying the recording.

15. The method of claim 14 wherein the prefix field is of the same code type as the code for the first type on the recorded stripe.

16. The method of claim 1 further including the steps of displaying a predetermined pattern of information on a video screen, which pattern includes data of different information types located at different predetermined points in said pattern; and selecting data from said predetermined points for recording in fields in a predetermined sequence corresponding to the positions of the points in said pattern.

17. The method of claim 10 further including encoding the numeric data in 4-bit code, the alpha data in 5-bit code, the alphanumeric data in 6-bit code and the ASCII character data in 7-bit code.

18. The method of claim 17 further including recording the data in sequence as 4-bit encoded data, 5-bit encoded data, 6-bit encoded data, and 7-bit encoded data.

19. The method of encoding information for recording on a magnetic medium comprising the steps of:

organizing data by type of information content into data types, the data types differing from each other in the minimum number of bits required to uniquely represent the data of a given type;

encoding the data in each type in binary code by assigning codes thereto having a number of bits corresponding to said minimum number for that type, there being at least two different types of data encoded with two sets of codes differing from each other in the number of bits for each set; and recording the encoded data on the magnetic medium;

wherein the data are recorded in respective individual fields, each field having a length which is one code longer than the extent of the data recorded therein.

20. The method of claim 19 wherein each individual field includes the data recorded therein followed by a field separator code.

21. The method of reading a magnetic stripe having data organized in different types successively recorded thereon and displaying the recorded data at predetermined points within a predetermined pattern presented on a display screen, said types being organized according to the type of data therein, the characters for the data in each different type being encoded in binary codes of different bit length for the different types, said method comprising the steps of:

causing said predetermined pattern to be displayed on the screen;

reading the magnetic stripe;

displaying at predetermined points in said pattern adapted for data of a first type the data from the first type which is read; and displaying at other predetermined points in said pattern data from succeeding types which are read.

22. The method of claim 21 wherein the position of the displayed data is dependent upon the order in which the data is read from the magnetic stripe.

23. The method of claim 22 wherein the order of the types read from the magnetic stripe is numeric, alpha, alphanumeric, and ASCII.

24. The method of claim 21 wherein the termination of each group of data displayed at a particular point in the display is identified by a field separator code.

25. The method of claim 24 wherein the termination of data of a given type is identified by a type separator code.

26. The method of claim 25 wherein the type separator code and the field separator code are different for each different type of data.

27. The method of claim 26 wherein the field separator code for a given data type is different from the type separator code of that type.

28. The method of claim 21 wherein the bit length for each type is equal to the minimum number of bits needed to uniquely encode the data of that type.

29. The method of claim 21 wherein the data is read by fields, each field corresponding in length to the extent of data contained therein, and wherein the end of a field is identified by a field separator code which is unique to the type of data in the field.

30. The method of claim 29 wherein the first field to be read from the magnetic stripe comprises a card prefix for defining the information on the magnetic stripe.

31. The method of claim 30 wherein the card prefix is encoded in the same format as the data of the first type being read.

32. The method of claim 28 wherein the data of the first type are encoded in a 4-bit code, the data of the second type are encoded in a 5-bit code, and the data of succeeding type are encoded in 6-bit and 7-bit codes, respectively.

33. An item bearing a recording medium in the form of a magnetic stripe having data recorded thereon encoded in a selected binary code format, wherein the magnetic stripe comprises:

discrete regions of recorded data organized by types in accordance with the type of data recorded, each different type being encoded with a different length code from other types.

34. The item of claim 33 wherein the data recorded in one of said regions is numeric type data encoded in 4-bit code.

35. The item of claim 34 wherein another region contains alpha type data encoded in 5-bit code.

36. The item of claim 34 wherein another region contains alphanumeic type data encoded in 6-bit code.

37. The item of claim 34 wherein another region contains ASCII character type data encoded in 7-bit code.

38. The item of claim 34 wherein different discrete regions following said one region contain, respectively, alpha type data encoded in 5-bit code, alphanumeric type date encoded in 6-bit code, and ASCII character type data encoded in 7-bit code.

39. The item of claim 38 wherein said discrete regions are arrayed in succession next to each other in the order of numeric type, alpha type, alphanumeric type and ASCII character type.

40. The item of claim 33 wherein the data of the respective types are recorded in individual fields, each field being terminated by a field separator following the data recorded in that field.

41. The item of claim 40 wherein the fields within a type vary in length in accordance with the extent of the data stored in an individual field.

42. The item of claim 40 wherein each discrete region of recorded data for a different type is terminated by a type separator following the last field for that type.

43. The item of claim 42 wherein the separators are encoded in different length codes, depending upon the type in which the separators are located.

44. The item of claim 34 wherein the numeric type data is recorded in fields and wherein the first field of said type is a prefix field for defining the recorded information on the item.

45. The item of claim 33 wherein the data of different types are recorded in fields of variable length, the field length being variable from type to type in accordance with the number of bits selected for encoding data for a given type.

* * * * *